US012728882B2

(12) United States Patent
Kuehner et al.

(10) Patent No.: US 12,728,882 B2
(45) Date of Patent: Sep. 8, 2026

(54) COMMUNICATING A BLENDING CONTROL PARAMETER USING A SEAT OF A VEHICLE

(71) Applicant: TOYOTA RESEARCH INSTITUTE, INC., Los Altos, CA (US)

(72) Inventors: Manuel Ludwig Kuehner, Mountain View, CA (US); Hiroshi Yasuda, San Francisco, CA (US); Guillermo Pita Gil, Redwood City, CA (US)

(73) Assignees: TOYOTA RESEARCH INSTITUTE, INC., Los Altos, CA (US); TOYOTA JIDOSHA KBUSHIKI KAISHA, Toyota (JP)

( * ) Notice: Subject to any disclaimer, the term of this patent is extended or adjusted under 35 U.S.C. 154(b) by 807 days.

(21) Appl. No.: 17/714,076

(22) Filed: Apr. 5, 2022

(65) Prior Publication Data

US 2023/0311924 A1 Oct. 5, 2023

(51) Int. Cl.
*B60W 50/16* (2020.01)
*B60Q 9/00* (2006.01)
(Continued)

(52) U.S. Cl.
CPC ............ *B60W 50/16* (2013.01); *B60W 10/20* (2013.01); *B60W 50/08* (2013.01); *B60Q 9/00* (2013.01);
(Continued)

(58) Field of Classification Search
None
See application file for complete search history.

(56) References Cited

U.S. PATENT DOCUMENTS 9,855,945 B2 1/2018 Fung
10,081,365 B2 9/2018 Palmer
(Continued)

FOREIGN PATENT DOCUMENTS

KR 20000033374 A 6/2000
WO 2014149657 A1 9/2014

OTHER PUBLICATIONS

Erlien et al., "Shared Steering Control Using Safe Envelopes for Obstacle Avoidance and Vehicle Stability," IEEE Transactions on Intelligent Transportation Systems, 17(2):441-451, Nov. 4, 2015 (https://doi.org/10.1109/TITS.2015.2453404).

*Primary Examiner* — James J Lee
*Assistant Examiner* — Tawri M McAndrews
(74) *Attorney, Agent, or Firm* — SHEPPARD, MULLIN, RICHTER & HAMPTON LLP; Daniel N. Yannuzzi

(57) ABSTRACT

Systems and methods are provided for communicating a blending parameter via tactile feedback at a driver's seat of a vehicle (examples of tactile feedback may comprise vibrations and temperature/heat applied through the driver's seat). The blending parameter may represent the ratio between the driver's level of authority and an autonomous driving system's level of authority in performing a driving task (e.g., lateral steering). By communicating changes to a blending parameter over time, examples can help a driver form a mental picture of how the vehicle/autonomous driving system is operating. This feedback/understanding may by advantageous for various purposes such as driver coaching and helping drivers become more comfortable with autonomous driving systems.

13 Claims, 8 Drawing Sheets

(51) Int. Cl.

| | |
|---|---|
| ***B60W 10/20*** | (2006.01) |
| ***B60W 40/08*** | (2012.01) |
| ***B60W 50/00*** | (2006.01) |
| ***B60W 50/08*** | (2020.01) |
| ***B60W 50/14*** | (2020.01) |

(52) U.S. Cl.

CPC ..... *B60W 40/08* (2013.01); *B60W 2050/0029* (2013.01); *B60W 50/14* (2013.01); *B60W 2540/043* (2020.02); *B60W 2540/22* (2013.01)

(56) References Cited

U.S. PATENT DOCUMENTS

| | | | | |
|---|---|---|---|---|
| 10,137,777 | B2 | 11/2018 | Lu | |
| 10,457,146 | B2 | 10/2019 | Schnur | |
| 10,913,413 | B2 | 2/2021 | Rowe | |
| 2009/0093930 | A1 | 4/2009 | Hatano | |
| 2010/0007480 | A1 | 1/2010 | Uozumi | |
| 2016/0297358 | A1 | 10/2016 | Hergeth | |
| 2017/0227959 | A1* | 8/2017 | Lauffer | B60W 50/0098 |
| 2017/0253252 | A1* | 9/2017 | Donnelly | G06F 3/0346 |
| 2018/0164808 | A1* | 6/2018 | Prokhorov | B60W 50/085 |
| 2019/0009794 | A1 | 1/2019 | Toyoda | |
| 2019/0063797 | A1* | 2/2019 | Yi | F25B 21/04 |
| 2020/0216095 | A1* | 7/2020 | Isozaki | A61M 21/00 |
| 2020/0277004 | A1 | 9/2020 | Zheng | |
| 2020/0290646 | A1 | 9/2020 | Safour | |
| 2020/0346642 | A1 | 11/2020 | Varunjikar | |
| 2021/0039715 | A1 | 2/2021 | Ferrer | |
| 2021/0183215 | A1 | 6/2021 | Carter | |
| 2022/0032922 | A1* | 2/2022 | Lee | G08G 1/09623 |
| 2022/0212679 | A1* | 7/2022 | Winther | H04W 4/44 |

* cited by examiner

10
SENSORS 152
STEERING ANGLE 112
THROTTLE PED. 114
BRAKE PED. 116
TPMS 120
ROLL/PITCH/YAW 122
CLEARANCE 124
L/R F/R SLIP RATIO 126
ENVIRONMENTAL 128
OTHER 132
BLENDING PARAMETER COMMUNICATION CIRCUIT 110
101
115
WIRELESS TRANSCEIVER CIRCUIT 102
WIRED I/O INTERFACE 104
MEMORY 108
PROCESSOR 106
103
ASSIST SWITCH 105
POWER SUPPLY 113
DRIVER INPUT SYST. 172
ADS 174
DRIVER'S SEAT ACTUATORS 176
OTHER 178
VEHICLE SYSTEMS 158

| Blending Parameter (λ) | Steering Rack Output (u) |
|---|---|
| 0.0 | 60° (2 o'clock) |
| 0.3 | 42° |
| 0.5 | 30° (1 o'clock) |
| 0.8 | 12° |
| 1.0 | 0° (12 o'clock) |

COMMUNICATING A BLENDING CONTROL PARAMETER USING A SEAT OF A VEHICLE

TECHNICAL FIELD

The present disclosure relates generally to automotive systems and technologies, and more particularly, some examples relate to communicating a blending control parameter to a driver using tactile feedback.

DESCRIPTION OF RELATED ART

In shared control autonomous driving systems, driving tasks may be shared between a human driver and the autonomous driving system. In other words, both the human driver and autonomous driving system may contribute to the same driving task (e.g., lateral steering) at the same time with varying levels of authority. The ratio between the human driver's level of authority and the autonomous driving system's level of authority may be referred to as a blending parameter (also known as an "authority parameter").

Tactile feedback (also known as "haptic feedback" or "kinesthetic feedback") may refer to transmission of physical stimuli from an electronic device (e.g., an electronic control unit in a vehicle) to a human (e.g., a driver of the vehicle) to communicate a condition of a system or a change in condition for the system (e.g., a condition of vehicle operation or a state change in vehicle operation). Generally tactile feedback relates to a human's sense of touch. Examples of tactile feedback may comprise vibrations and heat/temperature, etc.

BRIEF SUMMARY OF THE DISCLOSURE

According to various examples of the disclosed technology, a method for communicating a blending parameter to a driver of a vehicle via tactile feedback at the driver's seat is provided. The method may comprise: (1) correlating, via a linear relationship, a blending parameter to a target sensory perception value to be perceived by a driver of a vehicle through the driver's seat, the blending parameter comprising a ratio between the driver's level of authority and an autonomous driving system's (ADS's) level of authority in performing a driving task; (2) determining a tactile feedback parameter to produce the target sensory perception value; and (3) generating the tactile feedback parameter at the driver's seat. In certain examples, the tactile feedback parameter and the blending parameter may be non-linearly correlated. In some examples, determining the tactile feedback parameter may comprise using a psychophysical model, which may be personalized for the driver.

In various examples, a method for communicating a blending parameter to a driver of a vehicle via thermal cues at the driver's seat is provided. The method may comprise: (1) correlating a blending parameter to a target temperature perception value to be perceived by a driver through the driver's seat, the blending parameter comprising a ratio between the driver's level of authority and an ADS's level of authority in performing a driving task; and (2) generating a thermal cue at the driver's seat to produce the target temperature perception value. In certain examples, generating the thermal cue may comprise: (a) determining a temperature parameter to produce the target temperature perception value; and (b) generating the thermal cue at the driver's seat in accordance with the temperature parameter. In some examples, determining the temperature parameter may comprise using a psychophysical model, which may be personalized for the driver.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any inventions described herein, which are defined solely by the claims attached hereto.

BRIEF DESCRIPTION OF THE DRAWINGS

The present disclosure, in accordance with one or more various examples, is described in detail with reference to the following figures. The figures are provided for purposes of illustration only and merely depict typical or examples.

Figure 1:
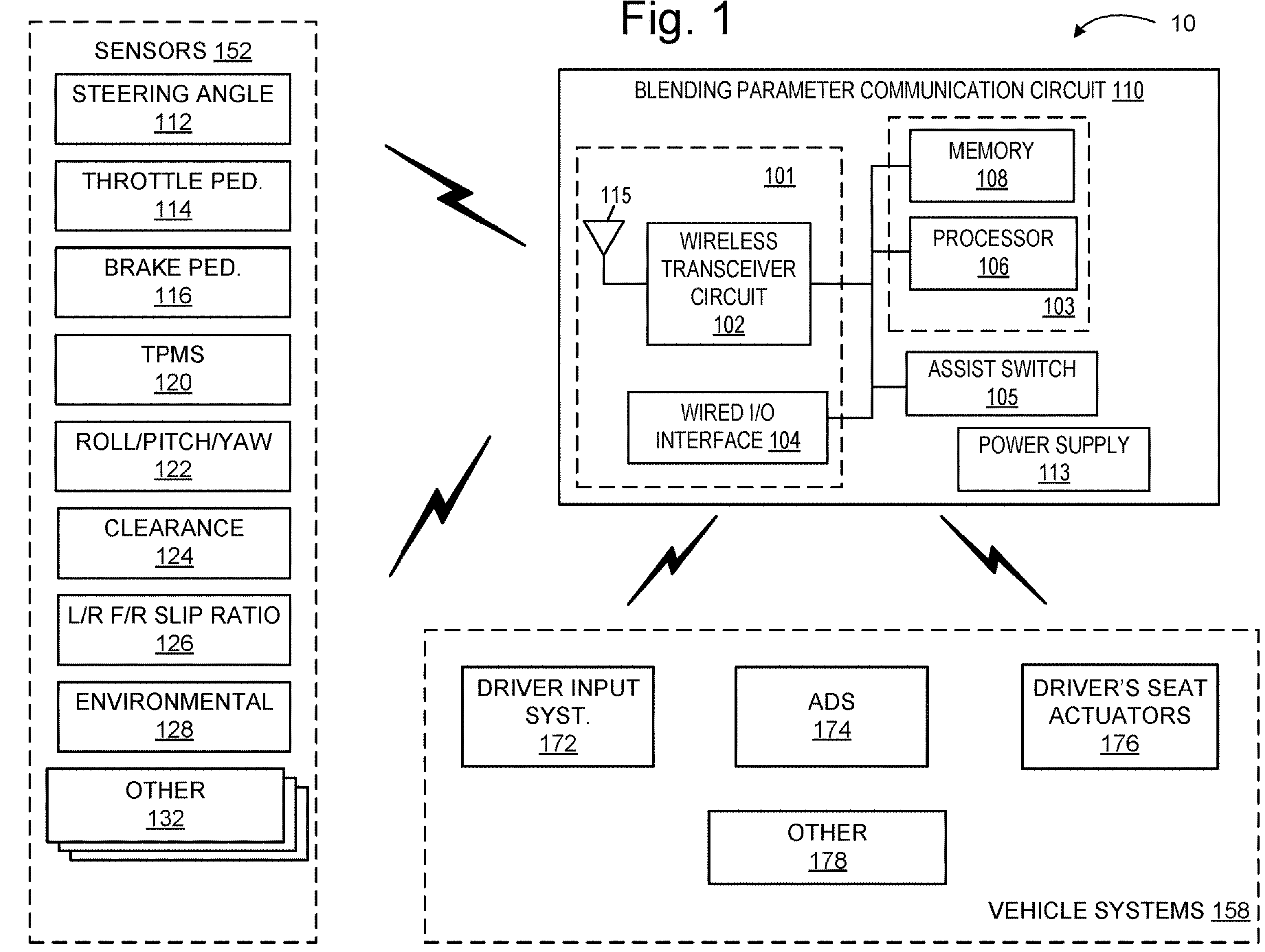
FIG. 1 illustrates an example architecture which can be used to communicate a blending parameter to a driver of a vehicle via tactile feedback at the driver's seat, in accordance with systems and methods described herein.

The figures are not exhaustive and do not limit the present disclosure to the precise form disclosed.

DETAILED DESCRIPTION

As described above, in shared control autonomous driving systems, both a human driver and the autonomous driving system may contribute to the same driving task (e.g., lateral steering) at the same time with varying levels of authority. The ratio between the human driver's level of authority and the autonomous driving system's level of authority may be referred to as a blending parameter (also known as an "authority parameter").

As examples of the presently disclosed technology appreciate, it can be advantageous for a driver to understand how a vehicle/autonomous driving system is operating. For example, such understanding may facilitate driver coaching, or help drivers become more comfortable with autonomous driving systems. At a more basic level, many drivers may be curious about how much (i.e., to what degree) an autonomous driving system is influencing the trajectory of their vehicle.

Against this backdrop, examples of the presently disclosed technology facilitate a driver's understanding of an autonomous driving system's level of authority in performing a driving task by communicating a blending parameter via tactile feedback at the driver's seat. In this way, examples may help the driver develop a mental model of how the autonomous driving system works and why the vehicle is behaving as it behaves.

Examples may correlate a blending parameter to a "target sensory perception value" to be perceived by the driver through the driver's seat. This target sensory perception value may comprise various sensory perceptions such as a perceived temperature, a perceived vibration frequency, a perceived vibration intensity, etc. Various examples may correlate the blending parameter and the target sensory perception value via a linear relationship in order to help the driver form a clearer mental picture of the blending parameter as it changes over time.

Upon correlating the blending parameter to a target sensory perception value, examples may determine a tactile feedback parameter to produce the target sensory perception value. As examples of the presently disclosed technology appreciate, humans can be sensitive to relative changes in physical stimuli (e.g., relative temperature changes, relative changes in vibration frequency or vibration intensity, etc.). In many cases, a human's sensory perception of a change in physical stimuli may be non-linear. Accordingly, examples of the presently disclosed technology may use psychophysical models to determine a tactile feedback parameter (i.e., a physical stimuli parameter) to produce the target sensory perception value. In many cases, this tactile feedback parameter will be non-linearly correlated with the target sensory perception value (and by extension, non-linearly correlated with the blending parameter).

Upon determining the tactile feedback parameter, examples may generate the tactile feedback parameter at the driver's seat. The tactile feedback parameter may be generated via various actuators (e.g., heating and cooling actuators, vibration actuators, etc.) implemented within various locations of the driver's seat (e.g., headrest, backrest, bottom of the seat, etc.). Certain examples may leverage existing actuators/systems (e.g., existing seat heating and cooling systems) to generate the tactile feedback parameter.

By communicating changes to a blending parameter over time, examples can help a driver form a mental picture of how the vehicle/autonomous driving system is operating. This feedback/understanding may by advantageous for various purposes such as driver coaching and helping drivers become more comfortable with shared autonomous driving systems.

Examples communicate the blending parameter through tactile feedback at the driver's seat for a number of reasons. First, because a driver will always be in contact with the driver's seat (at least hopefully), the driver's seat provides a communication channel which is always present. Second, by limiting tactile feedback to the driver's seat, examples reduce distractions/annoyances for other occupants of the vehicle. Third, tactile feedback mechanisms such as vibration mechanisms and temperature mechanisms present low-cost and automotive-grade technical solutions that can be easily applied to serial production. Fourth, because drivers may be unaccustomed to receiving information/feedback on a blending parameter, examples utilize feedback mechanisms (i.e., tactile feedback mechanisms at the driver's seat) not-widely used to communicate other driving-related parameters. In other words, by communicating the blending parameter through tactile feedback at the driver's seat, examples may reduce confusion with other driving-related parameters.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well (e.g., electric vehicles, hybrid vehicles, gasoline and diesel powered vehicles, etc.).

FIG. 1 illustrates an example vehicle system which can be used to communicate a blending parameter to a driver of the vehicle via tactile feedback at the driver's seat, in accordance with various examples of the presently disclosed technology. Referring now to FIG. 1, in this example, vehicle 10 may include a blending parameter communication circuit 110, a plurality of sensors 152, and a plurality of vehicle systems 158. Sensors 152 and vehicle systems 158 can communicate with blending parameter communication circuit 110 via a wired or wireless communication interface. Although sensors 152 and vehicle systems 158 are depicted as communicating with blending parameter communication circuit 110, they can also communicate with each other as well as with other vehicle systems. Blending parameter communication 110 can be implemented as an electronic control unit (ECU) in vehicle 10 or as part of an ECU. In other examples, blending parameter communication circuit 110 can be implemented independently of an ECU.

Blending parameter communication circuit 110 in this example includes a communication circuit 101, a decision circuit (including a processor 106 and memory 108 in this example) and a power supply 113. Components of blending parameter communication circuit 110 are illustrated as communicating with each other via a data bus, although other communication in interfaces can be included. Blending parameter communication circuit 110 in this example also includes a manual assist switch 105 that can be operated by the user to manually select the blending parameter communication mode.

Processor 106 can include a GPU, CPU, microprocessor, or any other suitable processing system. The memory 108 may include one or more various forms of memory or data storage (e.g., flash, RAM, etc.) that may be used to store the calibration parameters, images (analysis or historic), point parameters, instructions and variables for processor 106 as well as any other suitable information. Memory 108, can be made up of one or more modules of one or more different types of memory, and may be configured to store data and other information as well as operational instructions that may be used by the processor 106.

Although the example of FIG. 1 is illustrated using processor and memory circuitry, as described below with reference to circuits disclosed herein, decision circuit 103 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a blending parameter communication circuit 110.

Communication circuit 101 may include either or both of a wireless transceiver circuit 102 with an associated antenna 115 and a wired I/O interface 204 with an associated hardwired data port (not illustrated). As this example illustrates, communications with blending parameter communication circuit 110 can include either or both wired and wireless communications. Wireless transceiver circuit 102 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 115 is coupled to wireless transceiver circuit 102 and is used by wireless transceiver circuit 102 to transmit radio signals wirelessly to wireless equipment with which it is connected and to receive radio signals as well.

Wired I/O interface 104 can include a transmitter and a receiver (not shown) for hardwired communications with other devices. For example, wired I/O interface 104 can provide a hardwired interface to other components, including sensors 152 and vehicle systems 158. Wired I/O interface 104 can communicate with other devices using Ethernet or any of a number of other wired communication protocols whether standardized, proprietary, open, point-to-point, networked or otherwise.

Power supply 113 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include various types of sensors. In the illustrated example, sensors 152 include steering angle/handwheel position sensors 112, throttle pedal position sensors 114, brake pedal position sensors 116, a tire pressure monitoring system (TPMS) 120, accelerometers such as a 3-axis accelerometer 122 to detect roll, pitch and yaw of the vehicle, vehicle clearance sensors 124, left-right and front-rear slip ratio sensors 126, and environmental sensors 128 (e.g., to detect salinity or other environmental conditions).

Vehicle systems 158 can include a number of different vehicle components or subsystems used to control or monitor various aspects of vehicle 10 and its performance. In this example, the vehicle systems 158 include driver input systems 172 (e.g., steering wheel and associated sensors, throttle pedal and associated sensors, brake pedal and associated sensors, etc.); autonomous driving system (ADS) 174 which can share driving tasks with a driver of vehicle 10; driver's seat actuators 178 (e.g., heating and cooling actuators or vibration actuators implemented in the driver's seat); and other system 180 such as, for example, an engine control system, etc.

Figure 2:
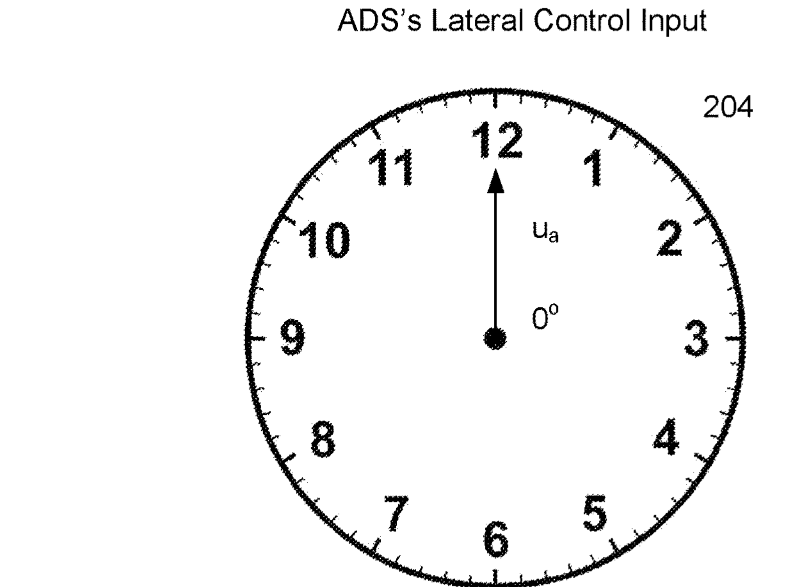
FIG. 2 is a collection of example diagrams/charts illustrating a blending parameter for an example shared control autonomous driving system, in accordance with examples of the systems and methods described herein.

FIG. 2 is a collection of example diagrams/charts illustrating a blending parameter for an example shared control autonomous driving system, in accordance with examples of the systems and methods described herein.

In particular, diagram 202 illustrates a human driver's lateral control input for controlling the lateral movement of a vehicle (e.g., vehicle 10). Diagram 204 illustrates an autonomous driving system's lateral control input for controlling the lateral movement of the vehicle. Chart 206 illustrates output steering rack position (u) (i.e., the output steering direction of the car) as a function of the blending parameter (λ).

As depicted by diagram 202, the driver's lateral control input (e.g., the driver's steering input or the driver's handwheel/steering wheel angle input) is 60° (i.e., 2 o'clock). When the autonomous driving system is deactivated, the driver's lateral control input may correspond to the output steering rack position (u).

When the autonomous driving system is activated, it provide a different lateral control input than the driver. As depicted by diagram 204, the autonomous driving system's lateral control input is a 0° (i.e., 12 o'clock) steering angle. The autonomous driving system may provide a different lateral control input than the driver for various reasons. For example, the autonomous driving system may predict that a certain steering rack position is required to avoid an obstacle.

As described above, shared control autonomous driving systems enable both a human driver and the autonomous driving system to contribute to the same driving task (e.g., lateral steering) at the same time with different levels of authority (this is in contrast to "traded control" autonomous driving systems where a given driving task is either performed 100% by a human driver or 100% by the autonomous driving system). In other words, the autonomous driving system may "blend" driving inputs from the human driver and autonomous driving system to produce a "blended" output steering rack position.

As depicted by chart 206, a blending parameter (λ) may represent the ratio between the human driver's level of authority in performing a driving task and the autonomous driving system's level of authority in performing the driving task. For example, a blending parameter of 0.0 may represent full authority for the human driver. By contrast, a blending parameter of 1.0 may represent full authority for the autonomous driving system, and a blending parameter of 0.5 may represent an equal split of authority, and so on. As depicted by chart 206, the output steering rack position of the vehicle (u) may be a function of the blending parameter. In various examples, the following equation may relate the blending parameter (λ), the driver's lateral control input ($u_d$), and the autonomous driving system's lateral control input ($u_a$), to the output steering rack position (u).

$$u=\lambda u_a+(1-\lambda)u_d, 0\leq\lambda\leq 1$$

Figure 3:
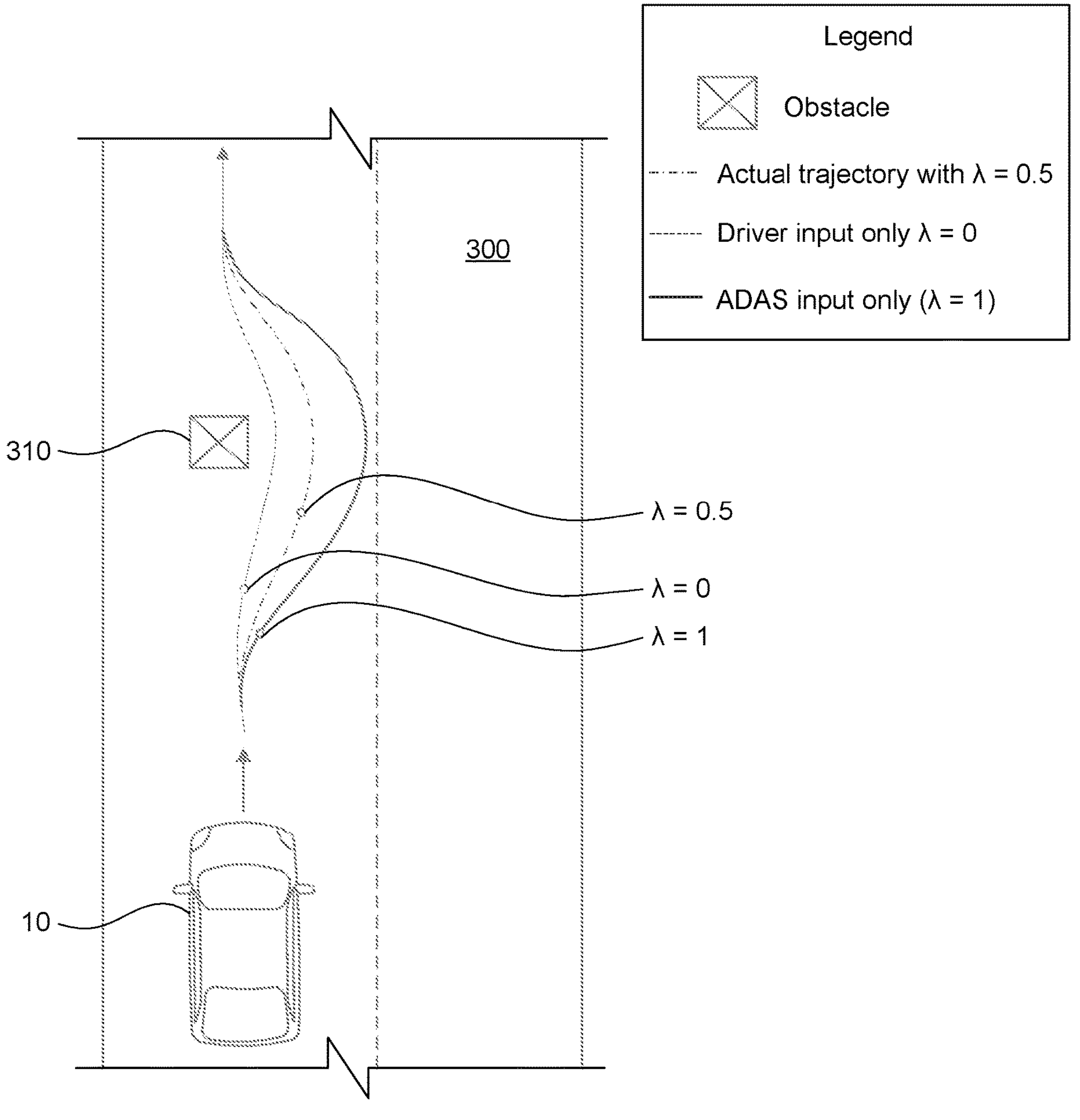
FIG. 3 is a diagram depicting an example shared control driving scenario, in accordance with various examples of the technology described herein.
Figure 4:
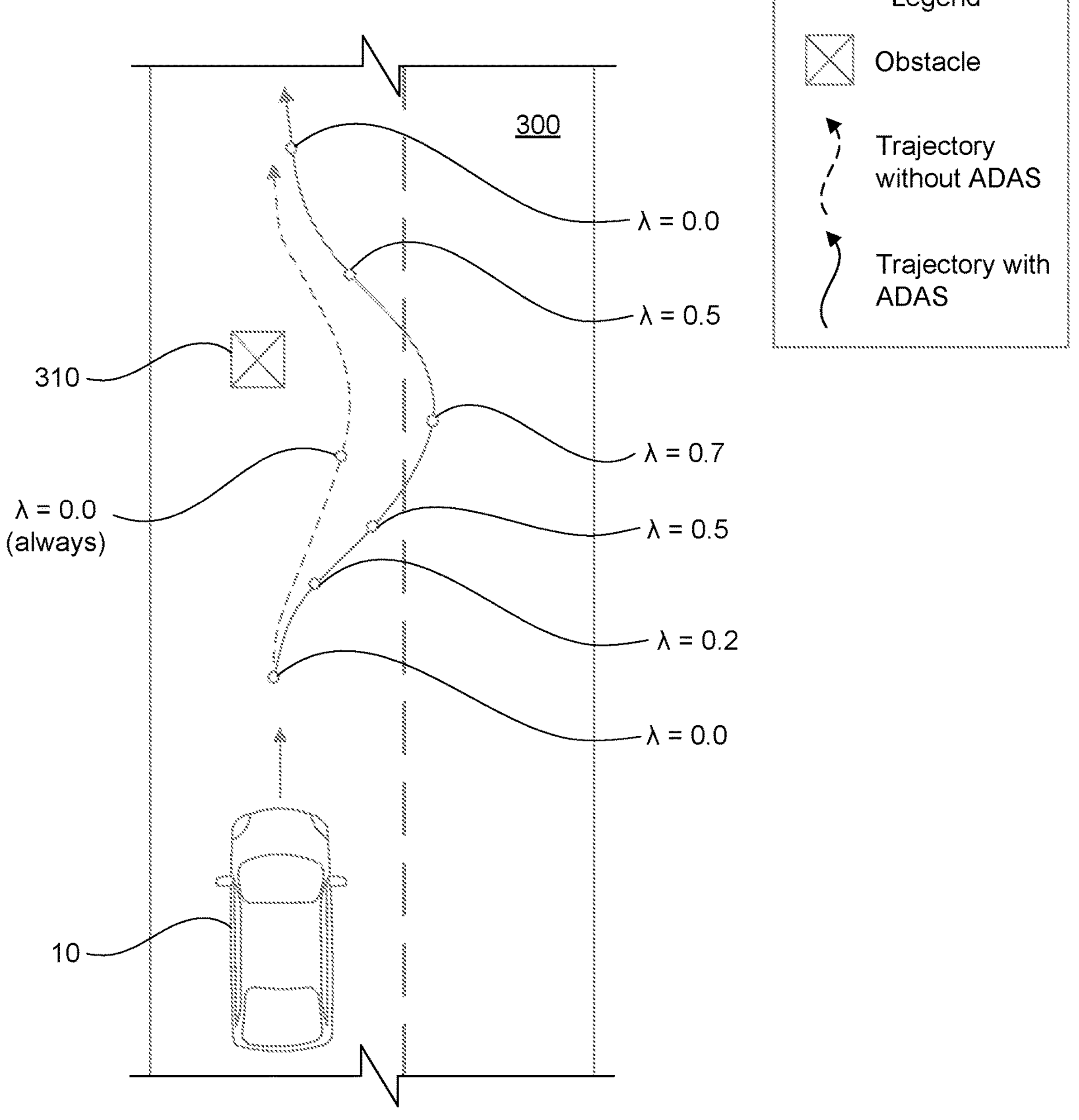
FIG. 4 is diagram depicting another example shared control driving scenario, in accordance with various examples of the technology described herein.

To be illustrated in conjunction with FIGS. 3 and 4, the value of the blending parameter, and by extension the output steering rack position, may affect the trajectory of a vehicle.

FIG. 3 is a diagram depicting an example shared control driving scenario, in accordance with various examples of the technology described herein. In particular, FIG. 3 depicts vehicle 10 traveling on roadway section 300 towards obstacle 310 (e.g., a piece of debris in the road).

FIG. 3 depicts three theoretical trajectories for vehicle 10 as it approaches obstacle 310. Each trajectory corresponds to a different value for the blending parameter (λ), held constant during the trajectory. The leftmost theoretical trajectory corresponds to λ=0 (i.e., 100% authority for human driver inputs). The rightmost theoretical trajectory corresponds to λ=1 (i.e., 100% authority for autonomous driving system inputs). The middle trajectory corresponds to λ=0.5 (i.e., an even split of authority between human driver inputs and autonomous driving system inputs).

FIG. 3 depicts a simplified shared control driving scenario where the blending parameter is held constant. However, in many shared control driving scenarios the blending parameter will change dynamically as a vehicle traverses a roadway. FIG. 4 depicts this dynamic scenario.

FIG. 4 is another diagram depicting an example shared control driving scenario, in accordance with various examples of the technology described herein. Like FIG. 3, FIG. 4 depicts vehicle 10 traveling on roadway section 300 towards obstacle 310.

FIG. 4 depicts two theoretical trajectories for vehicle 10 as it approaches obstacle 310. The leftmost theoretical trajectory corresponds to a trajectory for vehicle 10 with an inactive autonomous driving system (i.e., $\lambda=0$, or 100% authority for human driver inputs). The rightmost theoretical trajectory corresponds to a trajectory for vehicle 10 with an active shared control autonomous driving system. As depicted in the figure, the blending parameter ($\lambda$) increases from 0 to 0.7 as vehicle 10 approaches obstacle 310, and then decreases from 0.7 to 0 after vehicle 10 passes obstacle 310. In this example, the blending parameter ($\lambda$) may increase as vehicle 10 approaches obstacle 310 because the human driver's inputs may not be sufficient to avoid obstacle 310.

Examples of the presently disclosed technology may communicate this changing blending parameter to a driver of vehicle 10 via tactile feedback generated at the driver's seat. This feedback may help the driver form a mental picture of how the autonomous driving system of vehicle 10 is operating. Improving a driver's understanding of vehicle/autonomous driving system operation may help drivers become more comfortable with autonomous driving systems. Additionally, such feedback/understanding may be helpful for driver coaching/vehicle safety purposes.

As described above, examples may provide an improved mental picture of system operation for the driver by linearly correlating the blending parameter to the driver's sensory perceptions. To be described in greater detail in conjunction with FIG. 5, the relationship between a driver's sensory perception, and the physical stimuli (i.e., a tactile feedback parameter) which produce the sensory perception, may not be linear. Examples of the presently disclosed technology address this psychophysical phenomenon by determining/calculating tactile feedback parameters which produce a desired/target sensory perception for the driver.

Figure 5:
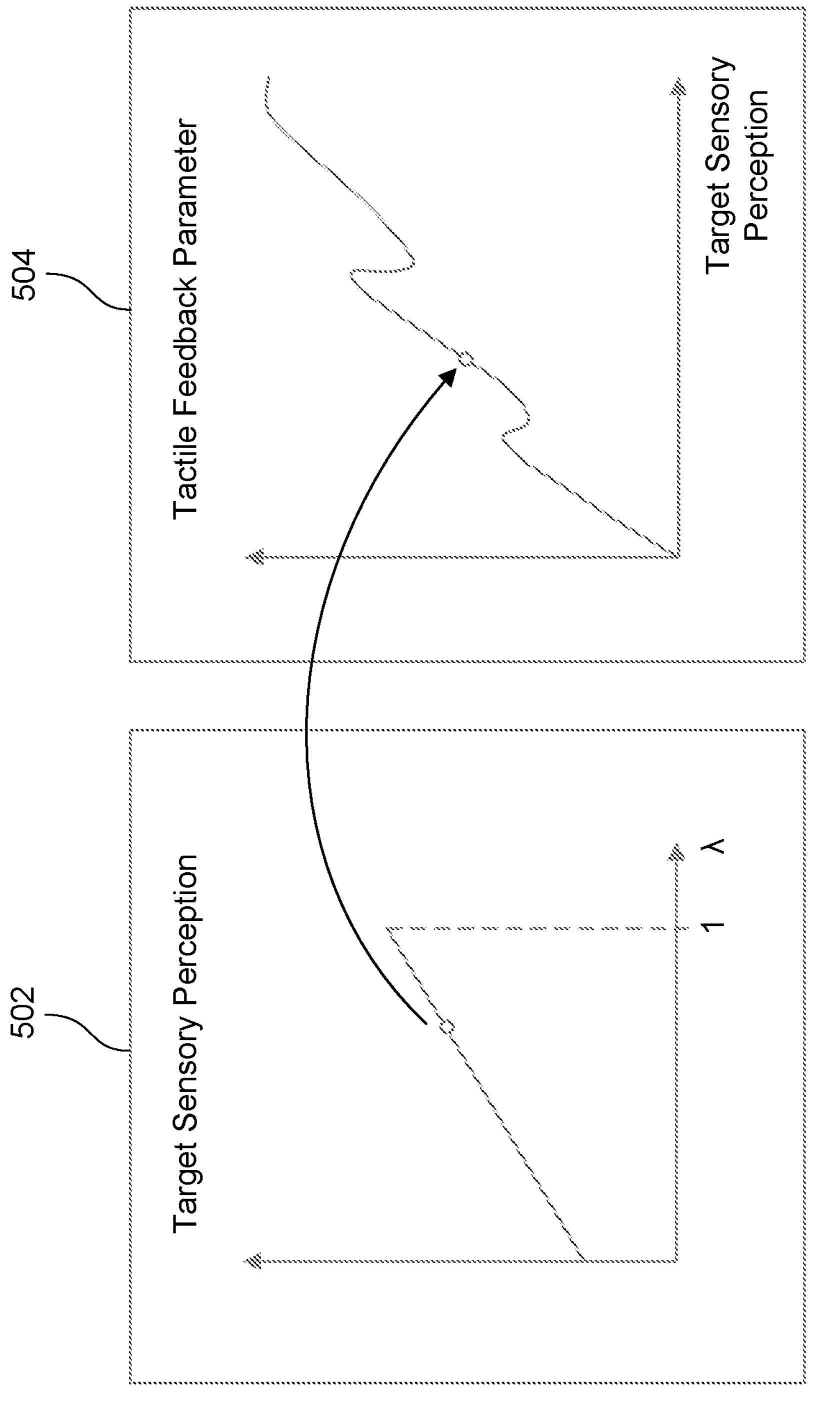
FIG. 5 depicts two example graphs which illustrate (1) how a blending parameter may be correlated to a target sensory perception value; and (2) how a tactile feedback parameter may be determined to produce the target sensory perception value, in accordance with various examples of the technology described herein.

FIG. 5 depicts two example graphs which illustrate (1) how a blending parameter may be correlated to a target sensory perception value; and (2) how a tactile feedback parameter may be determined to produce the target sensory perception value.

Graph 502 illustrates an example correlation between a blending parameter and a target sensory perception value. Here, a blending parameter may represent the ratio between a human driver's level of authority and an autonomous driving system's level of authority in performing a driving task. The value of this blending parameter may change as the autonomous driving system determines that more or less driving assistance is required.

The target sensory perception value may be a target sensory perception value to be perceived by the driver through the driver's seat. Examples of this target sensory perception value may include a perceived temperature, a perceived vibration frequency, a perceived vibration intensity, etc.

As described above, a linear correlation between changes to the blending parameter and changes in sensory perception may help the driver form a clearer mental picture of system operation. Accordingly, examples may strive to linearly correlate changes to the blending parameter to changes in the driver's sensory perception(s) (as represented by the target sensory perception value). Graph 502 illustrates such a linear relationship.

As described above, examples of the presently disclosed technology appreciate that the relationship between a driver's sensory perception, and the physical stimuli (i.e., a tactile feedback parameter) which produce the sensory perception, may be non-linear. Examples can address this psychophysical phenomenon by determining/calculating tactile feedback parameters to produce target sensory perception values using psychophysical models.

Graph 504 illustrates an example psychophysical model which may be used to correlate a target sensory perception value from graph 502 to a tactile feedback parameter which produces the target sensory perception value for the driver. As described above, this correlation/relationship may be non-linear.

A psychophysical model may refer to a mathematical equation or algorithm which relates physical stimuli (e.g., a tactile feedback parameter) to mental phenomena such as sensory perception. Such models may consider various environmental, physiological, and psychological factors.

For example, to correlate a target temperature perception value to a tactile feedback parameter, a psychophysical model may consider (a) the ambient temperature and humidity in the cabin of the vehicle; (b) the current temperature of driver's seat upholstery; (c) the driver's seat upholstery material; (d) skin temperature characteristics, (e) location of an applied temperature vis-a-vie a driver's body (e.g., head, back, legs, etc.); (f) stored calibration data related to the driver's perception of physical temperature changes, etc. Accordingly, the psychophysical model may determine a tactile feedback parameter (e.g., a particular temperature to be generated at particular locations of the driver's seat) which will produce the target temperature perception for the driver.

As a second example, to correlate a target vibration intensity perception value to a tactile feedback parameter, a psychophysical model may consider (a) background vibrations in the vehicle; (b) the shape of vibration at the driver's seat (e.g., sine wave vs. square wave); (c) frequency of vibration at the driver's seat; (d) amplitude (measured in displacement or force) of vibration at the driver's seat; (e) driver's seat upholstery material; (f) rigidity of the driver's seat; (g) location of the driver's seat vibration vis-a-vie the driver's body (e.g., head, back, legs, etc.); (h) the driver's body weight; (i) stored calibration data related to the driver's perception of vibration changes, etc. Accordingly, the psychophysical model may determine a tactile feedback parameter (e.g., a vibration of a particular shape, amplitude, and frequency to be generated at particular locations of the driver's seat) which will produce the target vibration intensity perception for the driver.

Figure 6:
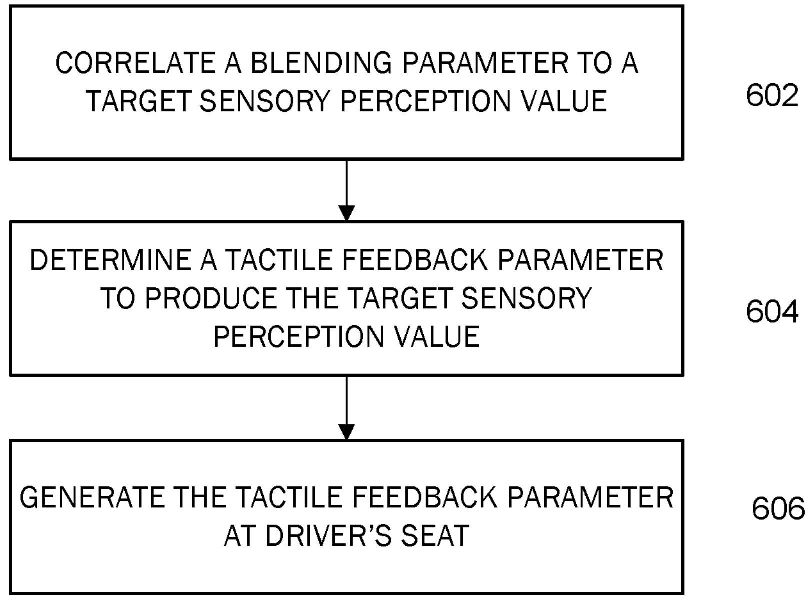
FIG. 6 illustrates example operations that can be performed by an electronic control unit (ECU) in a vehicle to communicate a blending parameter to a driver of the vehicle through tactile feedback at the driver's seat, in accordance with various examples of the technology described herein.

FIG. 6 illustrates example operations that can be performed by an electronic control unit (ECU) in a vehicle to communicate a blending parameter to a driver of the vehicle through tactile feedback at the driver's seat. In certain examples, these operations may be performed by blending parameter communication circuit 110. In various examples these operations may be performed dynamically.

At operation 602, the ECU correlates a blending parameter to a target sensory perception value, the target sensory perception value to be perceived by the driver through the driver's seat.

The blending parameter may represent a ratio between the driver's level of authority and an autonomous driving system's level of authority in performing a driving task.

The driving task may comprise various driving tasks such as lateral steering, longitudinal control (i.e., throttle and brake control), a combination of lateral control and longitudinal control, etc. Where the driving task comprises lateral steering, the driver's level of authority may comprise a level of authority for the driver's lateral control input (e.g., the driver's steering angle input or the driver's handwheel/steering wheel input) and the autonomous driving system's level of authority may comprise a level of authority for the autonomous driving system's lateral control input.

Examples of the target sensory perception value may include a perceived temperature, a perceived vibration frequency, a perceived vibration intensity, etc.

In various examples, the ECU may correlate the blending parameter to the target sensory perception value linearly. As described above, a linear correlation between the blending parameter and the driver's sensory perception may help the driver form a clearer mental picture of system operation.

At operation 604, the ECU determines a tactile feedback parameter to produce the target sensory perception value.

As described above, tactile feedback (also known as "haptic feedback" or "kinesthetic feedback") may refer to a transmission of physical/sensory stimuli from an electronic device (e.g., the electronic control unit in the vehicle) to a human (e.g., the driver of the vehicle) to communicate a condition of a system or a change in condition for the system (e.g., the blending parameter in a change in value for the blending parameter). Examples of tactile feedback may comprise vibrations and heat/temperature. Accordingly, the tactile feedback parameter may represent one or more physical stimuli to be transmitted through the driver's seat (e.g., vibrations transmitted through the driver's seat, heat/temperature transmitted through the driver's seat, etc.).

As described in conjunction with FIG. 6, examples of the presently disclosed technology appreciate that the relationship between a driver's sensory perception, and the physical stimuli (i.e., a tactile feedback parameter) which produce the sensory perception, may not be linear. Examples can address this psychophysical phenomenon by determining/calculating tactile feedback parameters to produce target sensory perception values using psychophysical models. Such models may consider various environmental, physiological, and psychological factors.

For example, to correlate a target temperature perception value to a tactile feedback parameter, a given psychophysical model may consider (a) ambient temperature and humidity in the cabin of the vehicle; (b) current temperature of driver's seat/upholstery; (c) seat/upholstery material; (d) skin temperature characteristics; (e) location of a generated temperature vis-a-vie the driver's body (e.g., head, back, legs, etc.); (f) stored calibration data related to the driver's perception of physical temperature changes, etc. Using this model, the ECU may determine a tactile feedback parameter (e.g., a particular temperature to be generated at particular locations of the driver's seat) which will produce the target temperature perception for the driver.

As a second example, to correlate a target vibration intensity perception value to a tactile feedback parameter, a psychophysical model may consider (a) background vibrations in the vehicle; (b) the shape of vibration at the driver's seat (e.g., sine wave vs. square wave); (c) frequency of vibration at the driver's seat; (d) amplitude of vibration at the driver's seat; (e) seat/upholstery material; (f) rigidity of the driver's seat; (g) location of the vibration vis-a-vie the driver's body (e.g., head, back, legs, etc.); (h) the driver's body weight; (i) stored calibration data related to the driver's perception of vibration changes, etc. Using this model, the ECU may determine a tactile feedback parameter (e.g., a vibration of a particular shape, amplitude, and frequency to be generated at particular locations of the driver's seat) which will produce the target vibration intensity perception for the driver.

In certain examples, the ECU may utilize psychophysical models which are personalized for the driver. For example, the driver may perform various calibration tests which correlate and record the driver's sensory perceptions in response to different physical stimuli/tactile feedback parameters. Accordingly, these stored calibration values may form a basis for a "personalized" psychophysical model for the driver.

As described above, in many cases the target sensory perception value and the determined tactile feedback parameter may be correlated non-linearly. Accordingly, the target sensory perception value may comprise a first temperature and the tactile feedback parameter may comprise a second (different) temperature. Similarly, the target sensory perception value may comprise a first vibration frequency or intensity and the tactile feedback parameter may comprise a second (and different) vibration frequency or intensity.

At operation 606, the ECU may generate the tactile feedback parameter at the driver's seat. The ECU may generate the tactile feedback parameter via various actuators (e.g., heating and cooling actuators, vibration actuators, etc.) implemented within various locations of the driver's seat (e.g., headrest, backrest, bottom of the seat, etc.).

Figure 7:
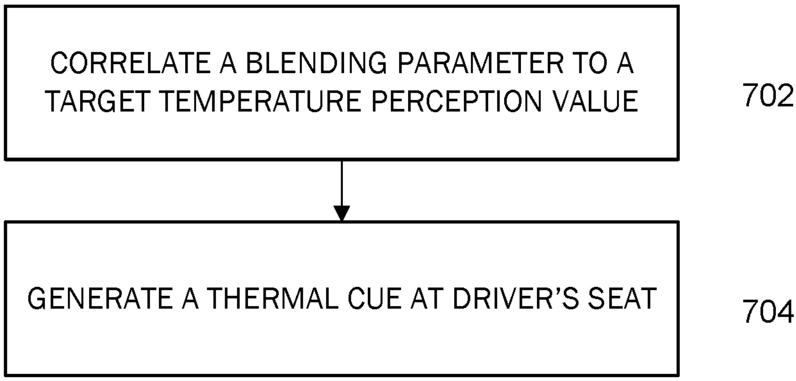
FIG. 7 illustrates example operations that can be performed by an ECU in a vehicle to communicate a blending parameter to a driver of the vehicle through a thermal cue at the driver's seat.

FIG. 7 illustrates example operations that can be performed by an ECU in a vehicle to communicate a blending parameter to a driver of the vehicle through a thermal cue at the driver's seat. In certain examples, these operations may be performed by blending parameter communication circuit 110. In various examples these operations may be performed dynamically.

At operation 704 the ECU correlates a blending parameter to a target temperature perception value to be perceived by the driver through the driver's seat. As described above, in various examples this may be a linear correlation.

At operation 706 the ECU generates a thermal cue at the driver's seat to produce the target temperature perception value. Here, a thermal cue may be a specific type of tactile feedback related to temperature/heat.

In various examples, generating the thermal cue at the driver's seat may comprise (1) determining a temperature parameter to produce the target temperature perception value; and (2) generating the thermal cue at the driver's seat in accordance with the temperature parameter. Here, the temperature parameter may be a specific type of tactile feedback parameter (as described in conjunction with FIG. 5) related to temperature/heat. Accordingly, the ECU may determine the temperature parameter to produce the target temperature perception value using a psychophysical model (as described in conjunction with FIG. 5).

Figure 8:
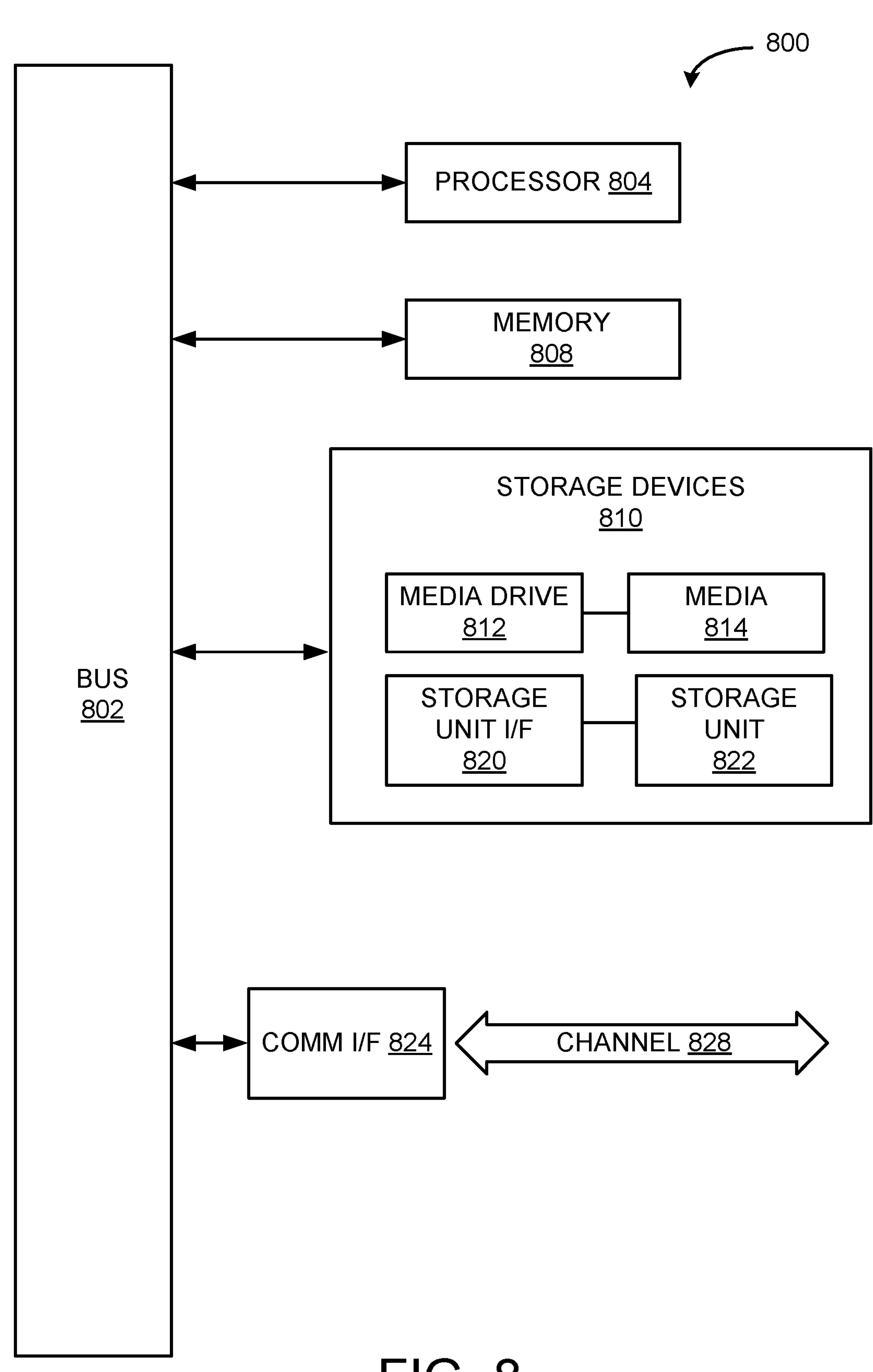
FIG. 8 is an example computing component that may be used to implement various features of examples described in the present disclosure, in accordance with various examples of the technology described herein.

As used herein, the terms circuit and component might describe a given unit of functionality that can be performed in accordance with one or more examples of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various examples are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative examples, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

What is claimed is:

1. A computer-implemented method comprising:

determining a blending parameter for a driving task for a vehicle, the blending parameter representing a ratio between a driver's level of authority and an autonomous driving system's (ADS's) level of authority in performing the driving task;

correlating the blending parameter to a target sensory perception value to be perceived by the driver through the driver's seat;

using a psychophysical model which correlates physical stimuli to sensory perception via a non-linear relationship to determine a physical stimulus value to produce the target sensory perception value, wherein the psychophysical model considers at least one of:

ambient temperature and humidity in the cabin of the vehicle;

current temperature of upholstery material of the driver's seat;

the upholstery material of the driver's seat;

skin temperature characteristics;

location of an applied temperature vis-a-vie the driver's body; or stored calibration data related to the driver's perception of physical temperature changes; and generating the physical stimulus value at the driver's seat thereby communicating to the driver the ADS's level of authority in performing the driving task.

2. The computer-implemented method of claim 1, wherein the physical stimulus value and the blending parameter are non-linearly correlated.

3. The computer-implemented method of claim 1, wherein the psychophysical model is personalized for the driver.

4. The computer-implemented method of claim 1, wherein:

the target sensory perception value comprises a first temperature; and the physical stimulus value comprises a second temperature.

5. The computer-implemented method of claim 1, wherein:

the driver's level of authority in performing the driving task comprises a level of authority for the driver's lateral control input; and the ADS's level of authority in in performing the driving task comprises a level of authority for the ADS's lateral control input.

6. The computer-implemented method of claim 1, wherein the blending parameter and the target temperature perception value are linearly correlated.

7. The computer-implemented method of claim 1, wherein:

the target temperature perception value comprises a first temperature; and the physical temperature stimulus value comprises a second temperature.

8. The computer-implemented method of claim 1, wherein: the driver's level of authority in performing the driving task comprises a level of authority for the driver's lateral control input; and the ADS's level of authority in performing the driving task comprises a level of authority for the ADS's lateral control input.

9. The computer-implemented method of claim 1, wherein the blending parameter and the target sensory perception value are correlated via a linear relationship.

10. The computer-implemented method of claim 1, performed dynamically as the blending parameter changes over time.

11. The computer-implemented method of claim 1, performed dynamically as the blending parameter changes over time.

12. A vehicle comprising:

a driver's seat; and one or more processors including machine executable instructions in non-transitory memory to cause the vehicle to:

determine a blending parameter for a driving task for a vehicle, the blending parameter representing a ratio between a driver's level of authority and the one or more processor's level of authority in performing the driving task;

correlate the blending parameter to a target sensory perception value to be perceived by the driver through the driver's seat;

use a psychophysical model which correlates physical stimuli to sensory perception via a non-linear relationship to determine a physical stimulus value to produce the target sensory perception value, wherein the psychophysical model considers at least one of:

ambient temperature and humidity in the cabin of the vehicle;

current temperature of upholstery material of the driver's seat;

the upholstery material of the driver's seat;

skin temperature characteristics;

location of an applied temperature vis-a-vie the driver's body; or stored calibration data related to the driver's perception of physical temperature changes; and generate the physical stimulus value at the driver's seat thereby communicating to the driver the ADS's level of authority in performing the driving task.

13. The vehicle of claim 12, wherein the blending parameter and the target sensory perception value are correlated via a linear relationship.

* * * * *